(12) United States Patent
Chen

(10) Patent No.: US 8,454,312 B2
(45) Date of Patent: Jun. 4, 2013

(54) WIND POWER GENERATOR APPARATUS

(75) Inventor: Shih-Hsiung Chen, Yongkang (TW)

(73) Assignee: Jetpro Technology, Inc., Tainan County (TW)

( * ) Notice: Subject to any disclaimer, the term of this patent is extended or adjusted under 35 U.S.C. 154(b) by 726 days.

(21) Appl. No.: 12/729,390

(22) Filed: Mar. 23, 2010

(65) Prior Publication Data

US 2011/0254278 A1    Oct. 20, 2011

(30) Foreign Application Priority Data

Jun. 16, 2009  (TW) .............................. 98210746 U

(51) Int. Cl.
*F03D 3/04* (2006.01)
(52) U.S. Cl.
USPC .............................. 416/55; 415/102; 415/905
(58) Field of Classification Search
USPC .............. 416/55; 415/101, 102, 93, 205, 120, 415/68, 66, 95, 94, 224, 224.5
See application file for complete search history.

(56) References Cited

U.S. PATENT DOCUMENTS

| | | | | |
|---|---|---|---|---|
| 3,876,925 A | * | 4/1975 | Stoeckert | 415/4.4 |
| 6,030,173 A | * | 2/2000 | Bacchiocchi | 415/98 |
| 2004/0115039 A1 | * | 6/2004 | Botros et al. | 415/101 |

* cited by examiner

*Primary Examiner* — Richard Edgar
(74) *Attorney, Agent, or Firm* — Chun-Ming Shih; HDLS IPR Services

(57) ABSTRACT

A wind power generator apparatus includes a housing (10) having a chamber (11), a wind generator set (20) in the chamber (11) and a wind collector (30) coupled to the wind generator set (20). The wind generator set (20) includes a base (21) fixed in the housing (10), a generator (22) mounted on the base (21) and a blade wheel (23) coupled to the generator (22). The wind generator set (20) can be installed in a vehicle (50) for generating electric power during driving. The power generated by the wind generator set (20) can be stored or used to charge the vehicle (50).

16 Claims, 5 Drawing Sheets

WIND POWER GENERATOR APPARATUS

BACKGROUND OF THE INVENTION

1. Technical Field

The invention generally relates to electric generators, particularly to wind generators for vehicles.

2. Related Art

The supply of petroleum has been insufficient for a couple of years, so the price of petroleum has become very expensive. Petroleum fuel causes serious pollutions during both refining and burning. But most power vehicles still use gasoline and diesel as fuels. Petroleum will be necessarily exhausted in the future, and the automobile exhaust also causes air pollution and global warming.

To solve this problem of pollution, electric cars are being developed aggressively. The most serious drawback of electric cars is insufficiency of electricity-storing capacity and lengthy time of battery charging. This is a major problem to be solved for electric cars.

On the other hand, modern cars depend on battery much more than ever. When a battery of a car has not sufficiently charged during driving or has over-discharged during rest, the car may not be ignited. Thus more electric power is good for cars.

SUMMARY OF THE INVENTION

An object of the invention is to provide a wind power generator apparatus which has simple structure and can be easily installed.

Another object of the invention is to provide a wind power generator apparatus which can be installed in a vehicle for generating electricity to charge battery thereof during driving.

To accomplish above objects, the wind power generator apparatus of the invention includes:

housing for being fixed on a vehicle, having a chamber, an intake and an outtake;

a wind generator set, accommodated in the chamber, and including a base fixed in the housing, a generator mounted on the base and a blade wheel coupled to the generator; and a wind collector, having an air inlet, an air outlet and an air passage therebetween, the air inlet and air outlet corresponding to the intake and the blade wheel respectively, and the air inlet being larger than the air outlet in size.

The wind power generator set can be installed in a vehicle for generating electric power during driving. The power generated by the wind power generator set can be stored or used to charge the vehicle.

DETAILED DESCRIPTION OF THE INVENTION

Figure 1:
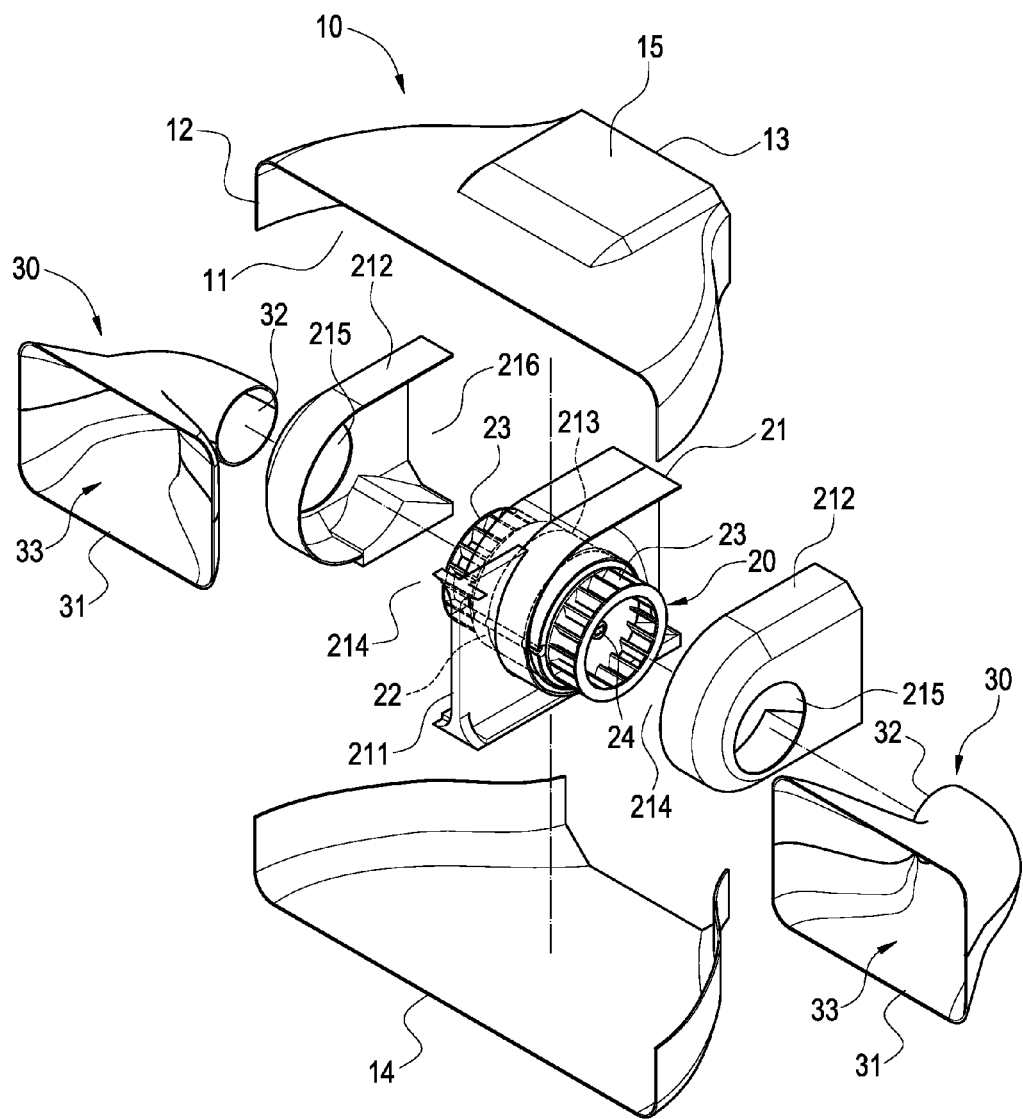
FIG. 1 is an exploded perspective view of the invention.
Figure 2:
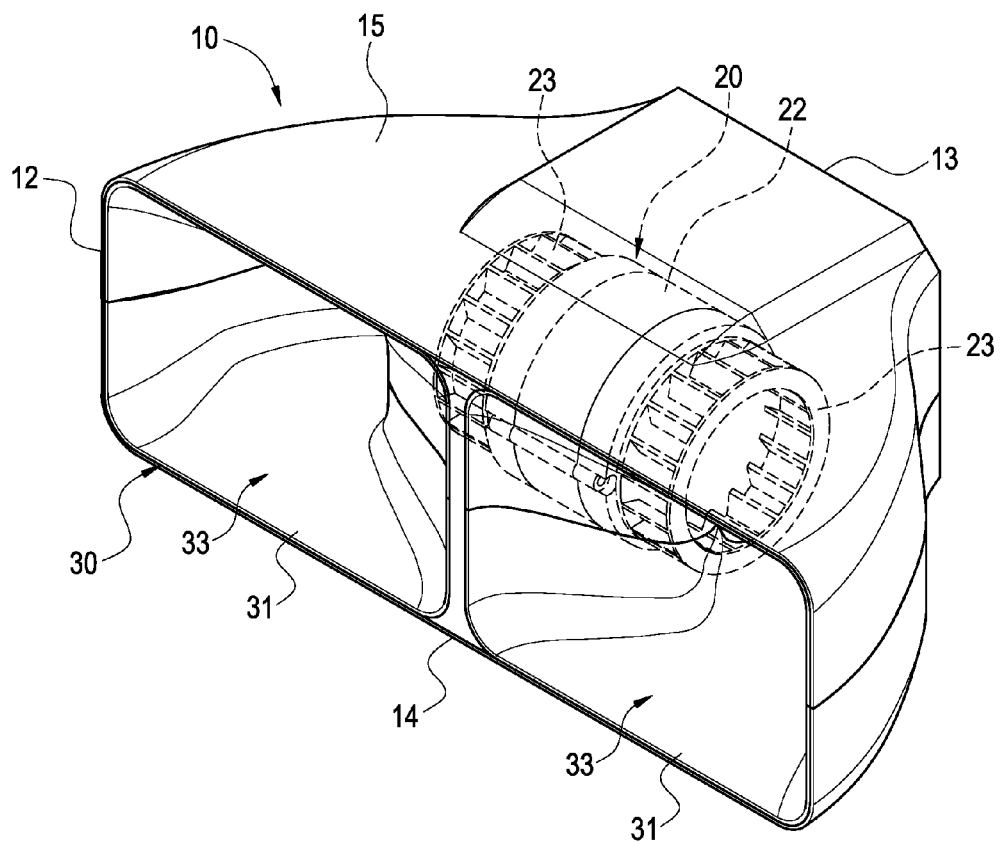
FIG. 2 is an assembled perspective view of the invention.
Figure 3:
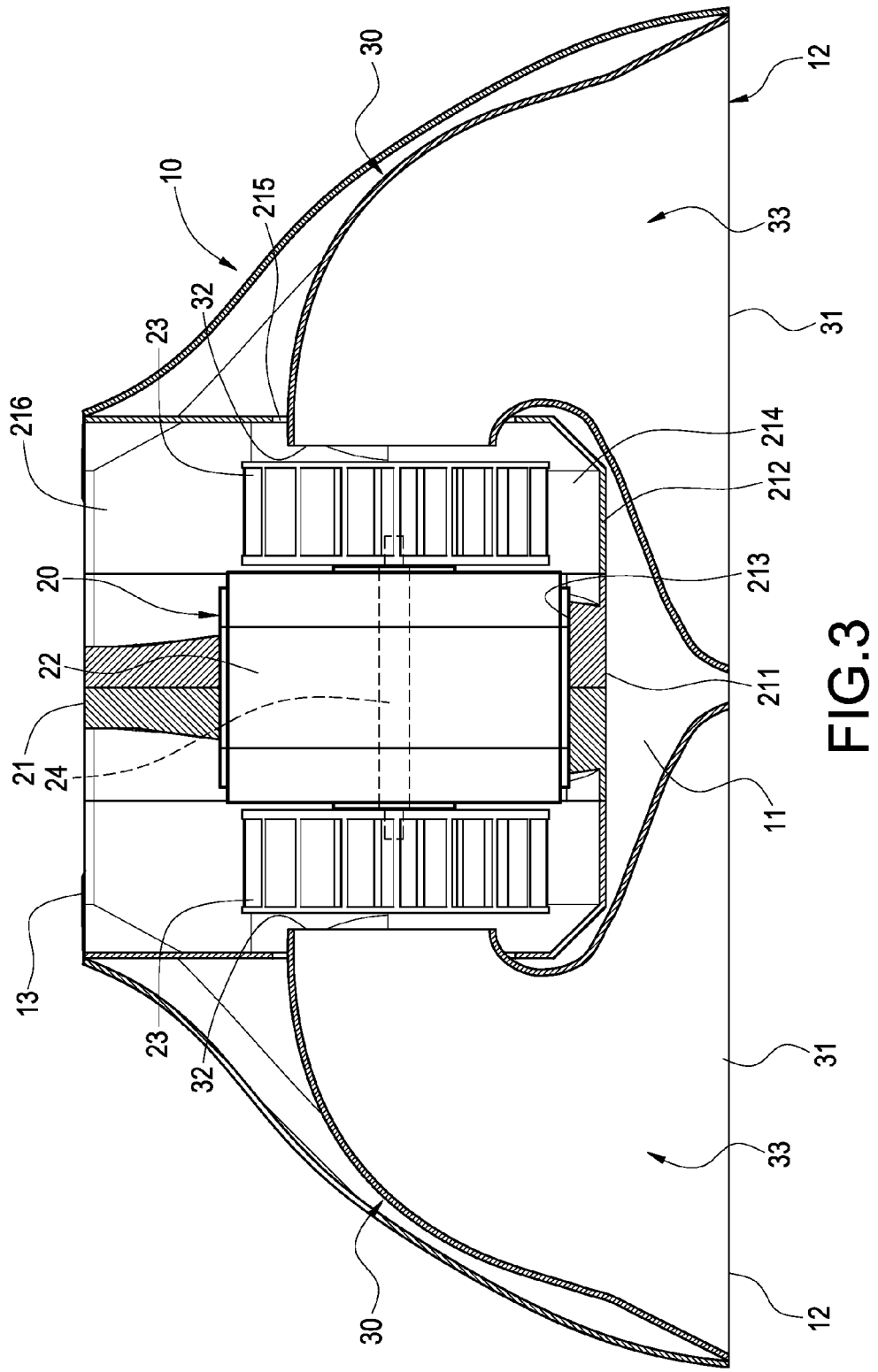
FIG. 3 is a cross-sectional view of the invention.

Please refer to FIGS. 1-3. The wind power generator apparatus of the invention includes a housing 10, a wind generator set 20 and two wind collectors 30.

The housing 10 is composed of a lower cover 14 and an upper cover 15. The lower cover 14 and upper cover 15 are of a shape of U and inverted U, respectively. A chamber 11 is formed by the two covers 14, 15. The housing 10 is provided with an intake 12 and outtake 13 communicating with the chamber 11.

The wind generator set 20 is accommodated in the chamber 11 and includes a base 21, a generator 22 and two blade wheels 23. The base 21 is fastened in the center of the chamber 11. The base 21 includes an inner seat 211 and two outer seats 212 disposed on both sides of the inner seats 211. An aperture 213 is disposed in the inner seat 211 and two wheel rooms 214 are separately formed in the two outer seats 212. The rear end of the base 21 is provided with two outputting openings 216 communicating with the wheel rooms 214. The outer seats 212 are separately provided with two inputting openings 215 communicating with the wheel rooms 214. The generator 22 is accommodated in the aperture 213. The two blade wheels 23 are separately fixed at two ends of a spindle 24 of the generator 22. The blade wheels 23 are separately accommodated in the wheel rooms 214 and sucking ends of the blade wheels 23 separately correspond to the inputting openings 215.

The wind collectors 30 are formed in a flared shape. The wind collector 30 includes an air inlet 31, an air outlet 32 and an air passage 33 therebetween. The air inlet 31 is larger than the air outlet 32 in size. The air passage 33 has a right-angled bend and tapers off from the air inlet 31 to air outlet 32. The air outlet 32 penetrates the inputting opening 215 and corresponds to the sucking end of the blade wheel 23.

Both sides of the base 21 separately connect the wind collectors 30. The intake 12 tightly encompasses the air inlets 31 of the wind collectors 30, while the outtake 13 tightly encompasses the outputting openings 216 of the base 21, so that the chamber 11 is formed. The air flow passing through the air inlets 31, air passages 33, air outlets 32, wheel rooms 214 and outputting openings 216 does not leak.

Figure 4:
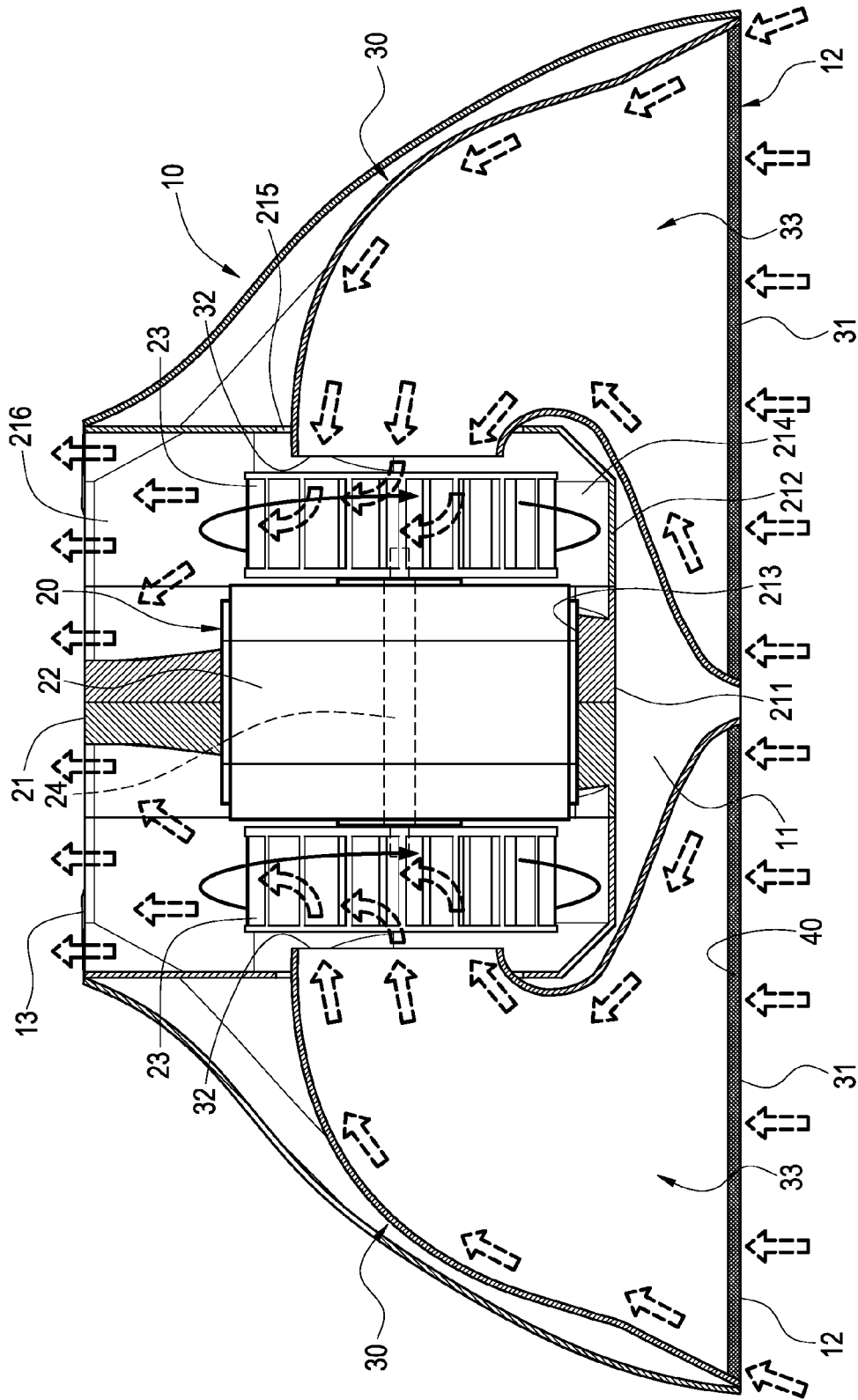
FIG. 4 shows the airflow within the wind power generator apparatus.

Please refer to FIG. 4. The wind generator set 20 is preferably provided with a filter 40 disposed in the air inlet 31 for filtering dusts in the air. When air enters the air inlets 31 and then passes the air passages 33, the air will be accelerated by the tapering shape. The accelerated air enters the sucking ends of the wheel rooms 214 through the inputting openings 215 to make the blade wheel 23 rotate and then power is generated by the generator 22. Finally, the air is ejected through the outputting openings 216. The air entry direction is perpendicular to the air emission direction because the blade wheel 23 is a centrifugal fan.

Figure 5:
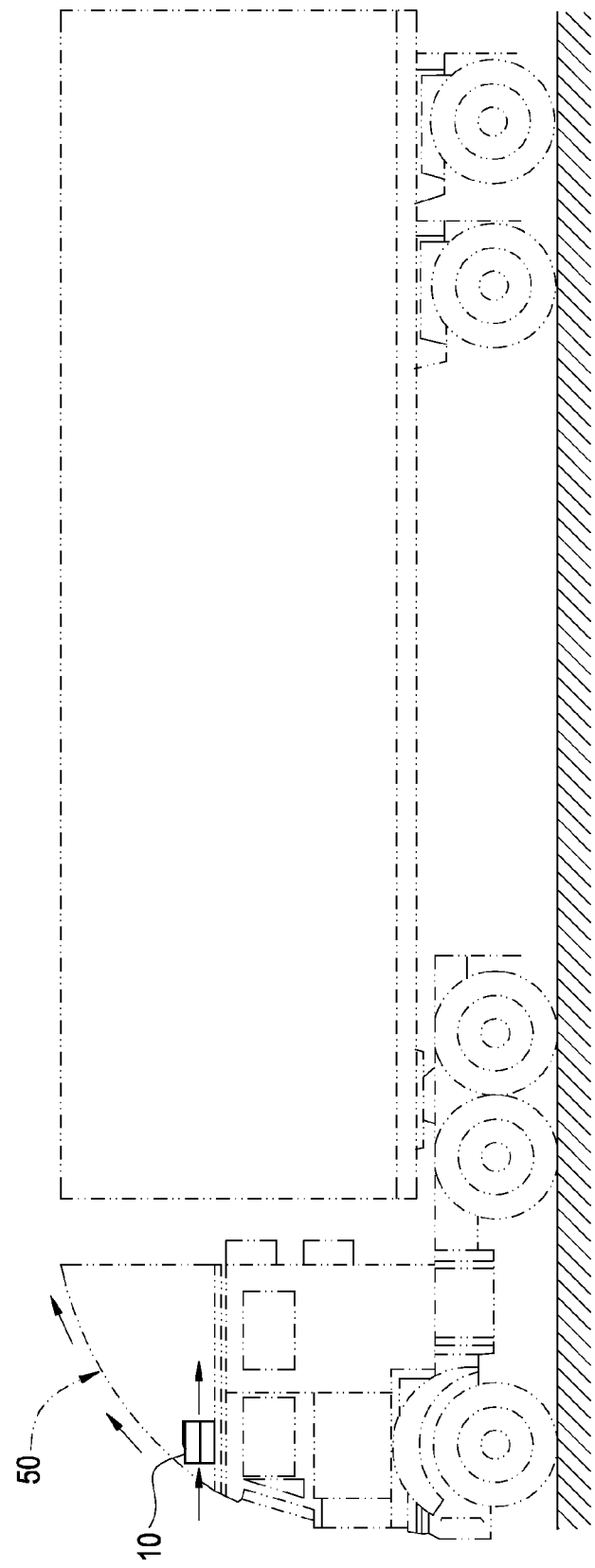
FIG. 5 shows an exemplary application of the invention to a vehicle.

As shown in FIG. 5, the wind power generator apparatus of the invention can be applied in a vehicle as an auxiliary generator. The wind power generator apparatus is preferably arranged at a windward position of the vehicle 50. The blade wheel 23 is rotated by wind and drives the generator 22 to generate power. The power generated by the generator 22 can charge a battery of the vehicle 50 during driving or can be stored to serve as an auxiliary power source during resting.

The foregoing description of the specific embodiment will so fully reveal the general nature of the invention that others can, by applying knowledge within the skill of the art (including the contents of the references cited herein), readily modify and/or adapt for various applications such a specific embodiment, without undue experimentation, without departing from the general concept of the present invention. Therefore, such adaptations and modifications are intended to be within the meaning and range of equivalents of the disclosed embodiment, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. A wind power generator apparatus comprising:
   a housing (10) having a chamber (11) therein, an intake (12) and an outtake (13), wherein the intake (12) and the outtake (13) communicate with the chamber (11);
   a wind generator set (20) accommodated in the chamber (11), wherein the wind generator set (20) comprises a base (21) fixed in the housing (10), a generator (22) mounted on the base (21) and a blade wheel (23) coupled to the generator (22); and
   a wind collector (30) having an air inlet (31), an air outlet (32) and an air passage (33) therebetween, wherein the air inlet (31) and air outlet (32) correspond to the intake (12) and the blade wheel (23), respectively, and the air inlet (31) is larger than the air outlet (32) in size,
   wherein the base (21) further comprises an inner seat (211) and an outer seat (212) disposed on one side of the inner seat (211), an aperture (213) is disposed in the inner seat (211) for accommodating the generator (22), and a wheel room (214) which communicates with the aperture (213) is formed in the outer seat (212) for accommodating the blade wheel (23).

2. The wind power generator apparatus of claim 1, wherein the housing (10) is composed of a lower cover (14) and an upper cover (15), and the chamber (11) is formed between the lower cover (14) and the upper cover (15).

3. The wind power generator apparatus of claim 1, wherein the wind generator set (20) further comprises a spindle (24), at which the blade wheel (23) is fixed.

4. The wind power generator apparatus of claim 1, wherein the blade wheel (23) is a centrifugal fan.

5. The wind power generator apparatus of claim 1, wherein the outer seat (212) is provided with an inputting opening (215) communicating with the wheel room (214), and the air outlet (32) penetrates the inputting opening (215).

6. The wind power generator apparatus of claim 1, wherein the base (21) is provided with an outputting opening (216) communicating with the wheel room (214), the intake (12) tightly encompasses the air inlet (31) of the wind collector (30), while the outtake (13) tightly encompasses the outputting opening (216) of the base (21).

7. The wind power generator apparatus of claim 1, wherein the air passage (33) tapers off from the air inlet (31) to the air outlet (32).

8. The wind power generator apparatus of claim 1, further comprising a filter (40) disposed in the air inlet (31).

9. A wind power generator apparatus used in a vehicle (50), the wind power generator apparatus comprising:
   a housing (10) fixed on the vehicle (50), the bellows (10) having a chamber (11) therein, an intake (12) and an outtake (13), wherein the intake (12) and the outtake (13) communicate with the chamber (11);
   a wind generator set (20) accommodated in the chamber (11), wherein the wind generator set (20) comprises a base (21) fixed in the housing (10), a generator (22) mounted on the base (21) and a blade wheel (23) coupled to the generator (22); and
   a wind collector (30) having an air inlet (31), an air outlet (32) and an air passage (33) therebetween, wherein the air inlet (31) and air outlet (32) correspond to the intake (12) and the blade wheel (23), respectively, and the air inlet (31) is larger than the air outlet (32) in size,
   wherein the base (21) further comprises an inner seat (211) and an outer seat (212) disposed on one side of the inner seat (211), an aperture (213) is disposed in the inner seat (211) for accommodating the generator (22), and a wheel room (214) which communicates with the aperture (213) is formed in the outer seat (212) for accommodating the blade wheel (23).

10. The wind power generator apparatus of claim 9, wherein the housing (10) is composed of a lower cover (14) and an upper cover (15), and the chamber (11) is formed between the lower cover (14) and the upper cover (15).

11. The wind power generator apparatus of claim 9, wherein the wind generator set (20) further comprises a spindle (24), at which the blade wheel (23) is fixed.

12. The wind power generator apparatus of claim 9, wherein the blade wheel (23) is a centrifugal fan.

13. The wind power generator apparatus of claim 9, wherein the outer seat (212) is provided with an inputting opening (215) communicating with the wheel room (214), and the air outlet (32) penetrates the inputting opening (215).

14. The wind power generator apparatus of claim 9, wherein the base (21) is provided with an outputting opening (216) communicating with the wheel room (214), the intake (12) tightly encompasses the air inlet (31) of the wind collector (30), while the outtake (13) tightly encompasses the outputting opening (216) of the base (21).

15. The wind power generator apparatus of claim 9, wherein the air passage (33) tapers off from the air inlet (31) to the air outlet (32).

16. The wind power generator apparatus of claim 9, further comprising a filter (40) disposed in the air inlet (31).

* * * * *